(12) United States Patent
Hiruma et al.

(10) Patent No.: US 12,305,046 B2
(45) Date of Patent: May 20, 2025

(54) INK JET INK COMPOSITION AND INK JET PRINTING METHOD

(71) Applicant: SEIKO EPSON CORPORATION, Tokyo (JP)

(72) Inventors: Kei Hiruma, Chino (JP); Mitsunobu Nakatani, Shiojiri (JP); Tomoyuki Ushiyama, Chino (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 282 days.

(21) Appl. No.: 18/127,070

(22) Filed: Mar. 28, 2023

(65) Prior Publication Data

US 2023/0312955 A1 Oct. 5, 2023

(30) Foreign Application Priority Data

Mar. 29, 2022 (JP) ................. 2022-054175

(51) Int. Cl.
*C09D 11/322* (2014.01)
*B41M 7/00* (2006.01)

(52) U.S. Cl.
CPC .......... *C09D 11/322* (2013.01); *B41M 7/0081* (2013.01)

(58) Field of Classification Search
CPC ....... B41J 2/01; B41M 7/0081; C09D 11/101; C09D 11/322; C09D 11/326; C09D 11/36
See application file for complete search history.

(56) References Cited

U.S. PATENT DOCUMENTS

| | | | |
|---|---|---|---|
| 2015/0315397 A1* | 11/2015 | Toyoda | B41J 2/04573 347/100 |
| 2017/0058138 A1 | 3/2017 | Kida et al. | |
| 2022/0032618 A1* | 2/2022 | Ushiyama | C09D 11/36 |

FOREIGN PATENT DOCUMENTS

| | | |
|---|---|---|
| EP | 2692806 A1 | 2/2014 |
| EP | 3546533 A1 | 10/2019 |
| EP | 4019597 A1 | 6/2022 |
| EP | 4036180 A1 | 8/2022 |
| JP | 2012-241062 A | 12/2012 |
| JP | 2013-227454 A | 11/2013 |
| JP | 2017-043722 A | 3/2017 |

* cited by examiner

*Primary Examiner* — Anh T Vo
(74) *Attorney, Agent, or Firm* — Harness, Dickey & Pierce, P.L.C.

(57) ABSTRACT

An ink jet ink composition contains a metal pigment and at least one liquid medium selected from the group consisting of organic solvents and water. The metal pigment is surface-modified with a surface treatment agent. The metal pigment is in the form of scale-like particles and has a volume average particle size $D_{50}$ of 1.0 μm or less. The ratio $D_{50}/Z$ of the volume average particle size $D_{50}$ of the metal pigment to the average thickness Z of the metal pigment particles is 17 or more, and the ratio $D_{50}/L$ of the volume average particle size $D_{50}$ to the nozzle diameter L of the ink jet head is 0.050 or less.

14 Claims, 1 Drawing Sheet

INK JET INK COMPOSITION AND INK JET PRINTING METHOD

The present application is based on, and claims priority from JP Application Serial Number 2022-054175, filed Mar. 29, 2022, the disclosure of which is hereby incorporated by reference herein in its entirety.

BACKGROUND

1. Technical Field

The present disclosure relates to an ink jet ink composition and an ink jet printing method.

2. Related Art

Metallic pigment compositions containing metal pigment enable the provision of printed products and colored products that are superior in metallic luster and, accordingly, have been being developed appropriately for use in the fields of ink jet printing, paints, and the like.

For example, JP-A-2017-43722 discloses a non-aqueous ink jet composition containing a surface-treated metal powder and having a specific dissolved oxygen decrease rate from the viewpoint of providing an ink composition or the like having high ejection consistency and storage stability despite containing the metallic powder. JP-A-2017-43722 discloses that the ejection consistency and the storage stability are improved by surface-treating the metal powder to give the surface of the metal powder an activity required to react with the oxygen in the composition and an activity to the extent that the powder does not react with the water or the like in the composition.

This composition is, however, still insufficient in gloss and ejection consistency.

SUMMARY

According to an aspect of the present disclosure, an ink jet ink composition used by being ejected from an ink jet heat is provided. The ink jet ink composition contains a metal pigment and a liquid medium. The liquid medium contains at least one selected from the group consisting of organic solvents and water, and the metal pigment is surface-modified with a surface treatment agent. The surface treatment agent contains at least one selected from the group consisting of compounds represented by the following formula (1) and compounds represented by the following formula (2). The metal pigment is in the form of scale-like particles and has a volume average particle size $D_{50}$ of 1.0 μm or less. The ratio ($D_{50}/Z$) of the volume average particle size $D_{50}$ to the average thickness Z of the metal pigment particles is 17 or more, and the ratio ($D_{50}/L$) of the volume average particle size $D_{50}$ to the nozzle diameter L of the ink jet head is 0.050 or less.

$$(R^1\text{—})P(O)(OH)_2 \tag{1}$$

wherein $R^1$ represents a substituted or unsubstituted hydrocarbon group with 14 or more carbon atoms.

$$(R^2\text{—O—})_aP(O)(OH)_{3-a} \tag{2}$$

wherein $R^2$s each independently represent a substituted or unsubstituted hydrocarbon group having a carbon skeleton with 14 or more carbon atoms, and a represents 1 or 2.

According to another aspect, an ink jet printing method is provided. The method includes an application step of ejecting the ink jet ink composition from an ink jet head with a nozzle diameter L to apply the ink composition onto a printing medium. The ratio $D_{50}/L$ of the volume average particle size $D_{50}$ to the nozzle diameter L is 0.050 or less.

DESCRIPTION OF EXEMPLARY EMBODIMENTS

Figure 1:
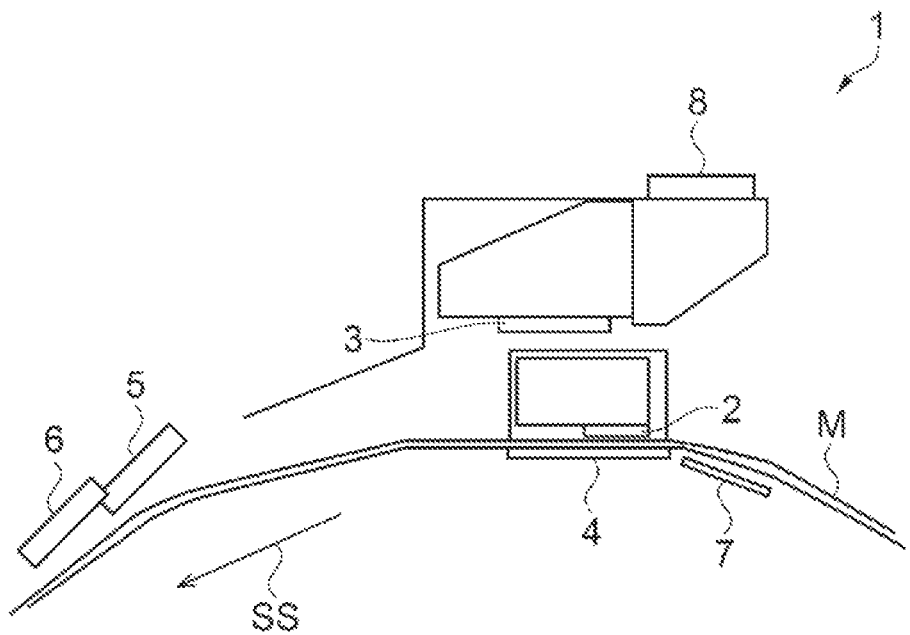
FIG. 1 is a schematic diagram of a printing apparatus used in an ink jet printing method according to an embodiment of the present disclosure.

Some embodiments of the present disclosure will now be described in detail with reference to the drawings as needed. However, the implementation of the concept of the present disclosure is not limited to the embodiments disclosed herein, and various modifications may be made without departing from the scope and spirit of the disclosure. The same elements in the drawings are designated by the same reference numerals, and thus description thereof is omitted. The vertical, lateral, and other positional relationships are in accordance with the drawings unless otherwise specified. The dimensional proportions in the drawings are not limited to those illustrated in the drawings.

1. Ink Jet Ink Composition

The ink jet ink composition disclosed herein is used by being ejected from an ink jet head for printing and contains a metal pigment and a liquid medium. The liquid medium contains at least one selected from the group consisting of organic solvents and water, and the metal pigment is surface-modified with a surface treatment agent. The surface treatment agent contains at least one selected from the group consisting of compounds represented by the following formula (1) and compounds represented by the following formula (2). The metal pigment is in the form of scale-like particles and has a volume average particle size $D_{50}$ of 1.0 μm or less. The ratio $D_{50}/Z$ of the volume average particle size $D_{50}$ to the average thickness Z of the metal pigment particles is 17 or more, and the ratio $D_{50}/L$ of the volume average particle size $D_{50}$ to the nozzle diameter L of the ink jet head is 0.05 or less.

$$(R^1\text{—})P(O)(OH)_2 \tag{1}$$

wherein $R^1$ represents a substituted or unsubstituted hydrocarbon group with 14 or more carbon atoms.

$$(R^2\text{—O—})_aP(O)(OH)_{3-a} \tag{2}$$

wherein $R^2$s each independently represent a substituted or unsubstituted hydrocarbon group having a carbon skeleton with 14 or more carbon atoms, and a represents 1 or 2.

Ink jet ink compositions containing a metal pigment surface-treated with a fluorine-containing surface treatment agent or the like have been studied for improving ejection consistency, storage stability, and other properties. However, those ink jet ink compositions have not reached satisfactory improvement in ejection consistency when ejected at high temperatures and in storage stability when stored at high temperatures for a long period, and further improvement is desired. Additionally, high gloss is also desired. Furthermore, environmentally friendly ink components are being desirably developed while ink compositions with high metallic luster are being pursued.

Also, metal pigments in the form of scale-like (flat) thin particles have been being developed to further improve the gloss. Such a metal pigment whose particles each have a larger surface area and a smaller thickness has a larger surface area per unit mass, and the scale-like metal particles tend to be oriented such that the surfaces of the particles become more parallel to the surface of the printing medium. Thus, the scale-like metal particles form a glossy layer, thereby increasing the gloss level of the resulting printed product. Such orientation of particles is also referred to as "leafing".

Unfortunately, such a scale-like metal pigment increases the gloss of the resulting printed product but is likely to form aggregates and result in degraded ejection consistency. Also, in some cases, the aggregates hinder the pigment from providing gloss as expected.

When the ink passes through a narrow flow path, scale-like particles are oriented so that the surfaces of the particles are along the flow of the ink. The scale-like particles thus can move within the ink flow path without opposing the ink flow. However, when scale-like particles stack one on the main surface of another to become larger, they are not oriented so that the main surfaces are along the ink flow and thus become difficult to move in the ink flow path, resulting in degraded ejection consistency.

In contrast, the ink jet ink composition disclosed herein contains a liquid medium and a metal pigment whose particles are surface-treated with a specific surface treatment agent and have a specific shape. Consequently, the ink jet ink composition exhibits improved ejection consistency and storage stability and can improve the gloss of the printed product.

The ink jet ink composition according to an embodiment of the present disclosure and an ink jet printing method using the ink composition will now be described.

1.1. Metal Pigment

The metal pigment used in the embodiments of the present disclosure is ejected from an ink jet head for printing. The metal pigment is surface-treated with a specific surface treatment agent that will be described later and is in the form of scale-like particles. The metal pigment has a volume average particle size $D_{50}$ of 1.0 µm or less, and the ratio $D_{50}/Z$ of the volume average particle size $D_{50}$ to the average thickness Z of the pigment particles is 17 or more. The ratio $D_{50}/L$ of the volume average particle size $D_{50}$ to the nozzle diameter L of the ink jet head is 0.05 or less.

The relationship between the metal pigment and the surface treatment agent is not particularly limited. For example, the surface modification of the metal pigment with a specific surface treatment agent described later enables the —OH groups at the surface of the metal pigment to react with the phosphate groups or phosphonate groups of the surface treatment agent, thus chemically binding the metal particles with the surface treatment agent.

The metal pigment is not particularly limited but may be, for example, entirely made of a metal, or the pigment particles may include a non-metal base portion and a metal coating covering the base portion. The non-metal base portion may be, for example, a scale-like resin base, and the entire surface of the resin base may be covered with a metal.

The amount of the metal pigment may be 0.1% by mass or more relative to the total mass of the ink jet ink composition and is, for example, 0.3% by mass or more, 0.5% by mass or more, 1.0% by mass or more, and 1.5% by mass or more. Also, the amount of the metal pigment may be 20% by mass or less relative to the total mass of the ink jet ink composition and is, for example, 15% by mass or less, 10% by mass or less, 5.0% by mass or less, 3.0% by mass or less, or 2.0% by mass or less.

1.1.1. Constituents

The metal of the metal pigment may be, but is not limited to, an elemental metal or an alloy. Examples of such a metal include aluminum, silver, gold, platinum, nickel, chromium, tin, zinc, indium, titanium, iron, and copper. In some embodiments, the metal pigment contains at least one metal of aluminum and aluminum alloys. Aluminum and aluminum alloys tend to be superior in gloss to other metals and have relatively low specific gravity compared to other metals, accordingly tending to provide good ejection consistency and storage stability. Additionally, the production cost of colored products produced using the ink jet ink composition can be kept low. A metal pigment may be used independently, or two or more metal pigments may be used in combination.

1.1.2. Shape

The metal pigment particles may be scale-like (flat), spherical, spindle-like, or needle-like and have any shape, provided that the $D_{50}/Z$ ratio and the $D_{50}/L$ ratio are within the specific ranges described above. In some embodiments, the metal pigment particles are scale-like, particularly scale-like and thin. Scale-like metal pigment particles are likely to be oriented so that the wider faces are along the surface of the printing medium. Consequently, such a metal pigment tends to further increase the gloss of the resulting colored product.

In particular, when the particles of the metal pigment are scale-like and thin, the metal pigment includes a relatively large number of particles compared to the same mass of other metal pigments because of the small thickness of the scale-like thin particles, accordingly increasing the total surface area of the metal pigment. Thus, the ink jet ink composition using a metal pigment in the form of scale-like thin particles is likely to allow the leafing of the particles when coloring an object, thus providing a high gloss.

The term "scale-like" used herein expresses a shape like a flat or curved sheet and whose area viewed at a specific angle, for example, viewed from above, is larger than the area viewed perpendicular to that specific angle. Such a scale-like shape can be represented by an indicator, $S_1/S_0$ that is the ratio of area $S_1$ (µm$^2$) to area $S_0$ (µm$^2$). $S_1$ is an area when the shape is viewed in a direction in which the projected area is largest, that is, when viewed from above. So is the largest of the areas viewed perpendicular to that viewing direction. The $S_1/S_0$ ratio may be 2 or more. In some embodiments, the $S_1/S_0$ ratio is 2 to 1000, for example, 5 to 500, 8 to 100, or 10 to 80.

The ratio $S_1/S_0$ may be, but is not limited to, the average obtained by observing, for example, 50 randomly selected metal pigment particles. The observation of the metal pigment particles may be performed by, but not limited to, electron microscopy, atomic force microscopy (hereinafter also referred to as AFM), or the like. Also, the ratio $D_{50}/Z$ of the volume average particle size $D_{50}$ of the metal pigment to the average thickness Z of the metal pigment particles may be controlled in the above-described range and used to indicate how scale-like the particles are.

Metal pigments in the form of scale-like particles, even though surface-treated, are unlikely to improve the ejection consistency of the ink composition. However, in the embodiments of the present disclosure, the ejection consistency of the ink composition can be improved despite using scale-like metal pigment particles, with the high gloss resulting from the scale-like particles ensured.

The physical properties of the pigment particles described below are based on AFM unless otherwise specified. Nano-Navi E-Sweep (manufactured by Hitachi High-Tech Science Corporation) may be used as the atomic force microscope.

3.1.1. Thickness

The average thickness of the metal pigment particles may be 100 nm or less, for example, 50 nm or less, 30 nm or less, or 25 nm or less, and in some embodiments, 20 nm or less. Also, the average thickness of the metal pigment particles is 1 nm or more and may be 3 nm or more or 5 nm or more. Metal pigments whose particles have an average thickness of 100 nm or less tend to exhibit high gloss.

4.1.1. Volume Average Particle Size

The volume average particle size $D_{50}$ of the metal pigment may be 1.5 µm or less, for example, 1.0 µm or less, 0.8 µm or less, or 0.6 µm or less. In some embodiments, the $D_{50}$ is 0.5 µm or less or 0.4 µm or less. Also, the volume average particle size $D_{50}$ of the metal pigment may be 0.1 µm or more, for example, 0.2 µm or less. In some embodiments, the $D_{50}$ is 0.3 µm or more. When the metal pigment has a volume average particle size $D_{50}$ of 1.5 µm or less, the ejection consistency of the ink composition tends to be further improved. Also, when the metal pigment has a volume average particle size $D_{50}$ of 0.1 µm or more, the gloss of the resulting product tends to be further improved.

The term volume average particle size $D_{50}$ refers to the median size in a volume size distribution of the particles dispersed in a liquid measured by laser diffraction/scattering and is the size of particles whose cumulative volume size percentage reaches exactly the median value, 50% when a large number of particles are measured. When the metal particles are scale-like, the volume average particle size is calculated based on the shape and size of imaginary spheres equivalent to the metal particles.

The ratio $D_{50}/Z$ of the volume average particle size $D_{50}$ to the average thickness Z of the metal pigment particles is 17 or more and may be 17 to 60, for example, 20 to 48 or 25 to 40. Metal pigments with a $D_{50}/Z$ ratio of 17 or more tend to exhibit a high gloss.

In addition, for the relationship with the ink jet head installed in the ink jet printing apparatus from which the ink composition is ejected, the ratio $D_{50}/L$ of the volume average particle size $D_{50}$ to the nozzle diameter L of the ink jet head is 0.050 or less and may be 0.010 to 0.050, for example, 0.015 to 0.040 or 0.020 to 0.030. When the ratio $D_{50}/L$ is 0.050 or less, the ink composition tends to exhibit good ejection consistency.

The nozzle diameter L of the ink jet head used with the ink jet ink composition disclosed herein may be 40 µm or less, for example, 5 µm to 30 µm, 10 µm to 30 µm, or 15 µm to 30 µm.

1.2. Surface Treatment Agent

The surface treatment agent used in the embodiments of the present disclosure is intended for surface treatment of the metal pigment disclosed herein and contains at least one compound selected from the group consisting of compounds represented by formula (1) and compounds represented by formula (2). In some embodiments, a compound represented by formula (1) is used from the viewpoint of improving gloss, ejection consistency, and storage stability.

$(R^1-)P(O)(OH)_2$          (1)

wherein $R^1$ represents a substituted or unsubstituted hydrocarbon group with 14 or more carbon atoms.

$(R^2-O-)_aP(O)(OH)_{3-a}$          (2)

wherein $R^2$s each independently represent a substituted or unsubstituted hydrocarbon group with 14 or more carbon atoms, and a represents 1 or 2.

The surface treatment agent may be one or a combination of such compounds.

As shown in the above formulas, the surface treatment agent has a phosphate or phosphonate moiety, which is a hydrophilic group, and a hydrocarbon moiety, which is a hydrophobic group. The reason why the surface treatment of the metal pigment with such a surface treatment agent improves the gloss of the resulting colored or printed product and the ejection consistency and storage stability of the ink composition is probably, but not limited to, that the phosphate or phosphonate group reacts with the OH groups at the surfaces of the metal pigment particles to chemically bind with the metal pigment. Then, probably, the hydrophobic groups not involved in binding with the metal pigment moderately cover the surfaces of the metal pigment particles, thereby improving the gloss and the ejection consistency and storage stability.

$R^1$ in formula (1) and $R^2$s in formula (2) are each independently a substituted or unsubstituted hydrocarbon group with 14 or more carbon atoms. A hydrocarbon group with 14 or more carbon atoms refers to a hydrocarbon group having a skeleton formed by 14 or more continuously bound carbon atoms. The number of carbons in $R^1$ and $R^2$ does not include the number of carbons in the substituent.

Examples of the substituent include, but are not limited to, carboxy, hydroxy, amino, and oxyalkylene. Although such a substituent may be substituted for one or more hydrogen atoms of each of $R^1$ and $R^2$, the number of substituents may be 1 or less (including the unsubstituted hydrocarbon group). In some embodiments, $R^1$ and $R^2$ do not have substituents.

$R^1$ and $R^2$ may be saturated hydrocarbons with no double bond or triple bond between adjacent carbon atoms or unsaturated hydrocarbons having a double bond or triple bond between adjacent carbon atoms. The hydrocarbon groups may be aromatic hydrocarbon groups whose carbon skeleton has an aromatic structure or chain or cyclic aliphatic hydrocarbon groups.

In some embodiments, $R^1$ and $R^2$ are chain aliphatic hydrocarbon groups. The chain aliphatic hydrocarbon group may be linear or branched, particularly linear.

Examples of $R^1$ and $R^2$ include, but are not limited to, n-tetradecyl, n-pentadecyl, n-hexadecyl (n-cetyl), n-heptadecyl, n-octadecyl, n-nonadecyl, n-icosyl, and n-tetracosyl.

In the structure of formula (1), in which any carbon atom of the hydrocarbon group $R^1$ is directly bound to the phosphorus atom, the carbon atom directly bound to the phosphorous atom may be that at an end of the $R^1$ molecular chain.

Similarly, in the structure of formula (2), in which any carbon atom of the hydrocarbon group $R^2$ is directly bound to the oxygen atom of ($R^2-O-$) with the oxygen atom directly bound to the phosphorus atom, the atom of $R^2$ directly bound to this oxygen atom may be the carbon atom at an end of the $R^2$ molecular chain.

The number of carbon atoms of $R^1$ and $R^2$ is 14 or more and may be 15 to 30, for example, 16 to 27, 17 to 25, or 18 to 24 from the viewpoint of improving the gloss of the resulting colored or printed product and the ejection consistency and storage stability of the ink composition. Thus, the gloss and the ejection consistency and storage stability tend to be improved.

The amount of the surface treatment agent may be 1.0% to 50% by mass, for example, 3.0% to 40% by mass or 5.0% to 30% by mass, relative to the total mass of the metal pigment. In some embodiments, the amount of the surface treatment agent is 10% to 20% by mass. When the amount of the surface treatment agent is in such a range, the ink jet ink composition tends to exhibit good ejection consistency and storage stability.

1.3. Liquid Medium

The ink jet ink composition disclosed herein contains a liquid medium. The liquid medium is a liquid constituent in which the metal particles and other constituents can be dispersed. The liquid medium may be referred to as solvent. The liquid medium component may be, but is not limited to, water or an organic solvent.

In an embodiment, the ink jet ink composition may be an aqueous composition containing water as the major liquid medium component or a solvent-based composition containing organic solvent as the major liquid medium component. An aqueous composition contains water as the major liquid medium component, and its water content may be 40% by mass or more relative to the total mass of the composition.

A solvent-based composition contains one or more organic solvents as the major liquid medium component, and its organic solvent content may be 60% by mass or more relative to the total mass of the composition. The water content of a solvent-based ink composition may be 2% by mass or less, for example, 1% by mass or less or 0.5% by mass or less, and the lower limit of the water content is 0% by mass.

Aqueous or solvent-based ink jet ink compositions can have a relatively low viscosity. Accordingly, such an ink composition is easy to eject consistently and facilitates the leafing of the pigment to produce high gloss or luster.

Desirably, the ink jet ink composition is not ultraviolet-curable.

The amount of the liquid medium may be 60% by mass or more, for example, 70% by mass or more or 80% by mass or more, relative to the total mass of the ink jet ink composition. Also, the amount of the liquid medium may be 98% by mass or less, for example, 90% by mass or less or 80% by mass or less, relative to the total mass of the ink jet ink composition.

When the ink jet ink composition is an aqueous composition, the proportion of water to the total mass of the liquid medium may be 30% by mass or more, for example, 40% by mass or more, 50% by mass or more, 60% by mass or more, 70% by mass or more, or 80% by mass or more. Also, the proportion of water to the total mass of the liquid medium may be 98% by mass or less, for example, 90% by mass or less, 80% by mass or less, 70% by mass or less, 60% by mass or less, 50% by mass or less, or 40% by mass or less.

When the ink jet ink composition is aqueous, the water content may be more than 40% by mass, for example, 50% by mass or more, 60% by mass or more, 70% by mass or more, or 80% by mass or more, relative to the total mass of the ink jet ink composition. Also, the proportion of water to the total mass of the liquid medium may be 98% by mass or less, for example, 90% by mass or less, 80% by mass or less, 70% by mass or less, 60% by mass or less, or 50% by mass or less.

The aqueous composition may further contain organic solvent. Also, the organic solvent content of the aqueous composition may be 40% by mass or less, for example, 30% by mass or less, 20% by mass or less, or 15% by mass or less, relative to the total mass of the aqueous composition. Also, the organic solvent content may be 0% by mass or more, for example, 0.5% by mass or more, 1% by mass or more, or 5% by mass or more, relative to the total mass of the ink jet ink composition.

When the ink jet ink composition is a solvent-based composition, the proportion of the organic solvent to the total mass of the liquid medium may be 70% by mass or more, for example, 80% by mass or more, 90 by mass or more, or 98% by mass or more. Also, the proportion of the organic solvent to the total mass of the liquid medium may be 98% by mass or less, for example, 90% by mass or less or 80% by mass or less.

When the ink jet ink composition is a solvent-based composition, the organic solvent content of the ink composition may be 60% by mass or more, for example, 70% by mass or more, 80% by mass or more, or 90% by mass or more, relative to the total mass of the ink jet ink composition. Also, the organic solvent content of the ink composition may be 98% by mass or less, for example, 90% by mass or less or 80% by mass or less, relative to the total mass of the ink jet ink composition.

1.3.1. Organic Solvent

In an embodiment, the ink jet ink composition may contain a water-soluble organic solvent. Example of such an organic solvent include, but are not limited to, alcohols, hydrocarbon-based compounds, ether-based compounds, glycol ethers, ketones, esters, propylene carbonate, N-methyl-2-pyrrolidone, N,N-dimethylformamide, N,N-dimethylacetamide, dimethyl sulfoxide, cyclohexanone, and acetonitrile.

In some embodiments in which the ink jet ink composition is aqueous, one or more glycol-based compounds are used as the organic solvent. Glycol-based compounds tend to further improve the gloss of the resulting printed or colored product and the ejection consistency and storage stability of the ink jet ink composition in synergy with the surface treatment agent. An organic solvent may be used independently, or two or more organic solvents may be used in combination.

More specific examples of the organic solvent include, but are not limited to, alcohols, such as methanol, ethanol, n-propyl alcohol, isopropyl alcohol, n-butanol, 2-butanol, tert-butanol, isobutanol, n-pentanol, 2-pentanol, 3-pentanol, and tert-pentanol; glycols, such as 1,2-hexanediol, ethylene glycol, diethylene glycol, triethylene glycol, propylene glycol, dipropylene glycol, 1,3-propanediol, 1,2-propanediol, 1,2-pentanediol, 1,4-butanediol, 1,5-pentanediol, 1,6-hexanediol; aromatic alcohol-based compounds, such as 2-phenoxyethanol, phenoxydiglycol, (methoxyphenoxy) ethanol, methyl phenoxyethanol, bis(B-hydroxyethyl)hydroxy ether, nonylphenol, phenol, cresol, resorcinol, catechol, hydroquinone, naphthol, and furfuryl alcohol; and glycerin and other polyhydric alcohols.

In some embodiments, the ink jet ink composition contains at least one glycol-based compound as the organic solvent. In other embodiments, two or more glycols may be contained. Such alcohols tend to further improve the gloss of the resulting printed or colored product and the ejection consistency and storage stability of the ink jet ink composition in synergy with the surface treatment agent. From the same viewpoint, at least either 1,2-hexanediol or propylene glycol, particularly both, may be used.

In some embodiments in which the ink jet ink composition is a solvent-based composition, the organic solvent is at least one selected from the group consisting of glycol ethers and esters. Glycol ethers and/or esters tend to further improve the gloss of the resulting printed product and the ejection consistency and storage stability of the ink jet ink composition in synergy with the surface treatment agent. An organic solvent may be used independently, or two or more organic solvents may be used in combination.

Examples of glycol ethers include, but are not limited to, triethylene glycol monomethyl ether, triethylene glycol dimethyl ether, triethylene glycol monobutyl ether, diethylene glycol monobutyl ether, diethylene glycol diethyl ether, dipropylene glycol monopropyl ether, and tetraethylene glycol monobutyl ether.

Examples of esters include, but are not limited to, ethyl acetate, propyl acetate, and butyl acetate. Cyclic esters may be used. Examples of cyclic esters include, but not limited to, γ-butyrolactone and other lactones.

Using such glycol ethers and/or esters as the organic solvent tend to further improve the gloss of the resulting printed product and the ejection consistency and storage stability of the ink jet ink composition in synergy with the surface treatment agent.

From the same viewpoint, the organic solvent may be at least one, particularly two or more or three or more, selected from the group consisting of diethylene glycol diethyl ether, tetraethylene glycol monobutyl ether, and γ-butyrolactone.

1.4. Resin

In an embodiment, the ink jet ink composition may further contain resin. The resin may be, but is not limited to, resin particles of, for example, urethane resin, acrylic resin (including styrene-acrylic resin), fluorene resin, polyolefin resin, rosin-modified resin, terpene resin, polyester resin, polyamide resin, epoxy resin, vinyl chloride resin, a vinyl chloride-vinyl acetate copolymer, or ethylene vinyl acetate resin. In some embodiments, the resin is urethane resin, acrylic resin, polyolefin resin, or polyester resin. Such resin particles are often used in the form of emulsion but may be in powder. The resin particles may be particles of an individual resin or a combination of two or more resins.

Urethane resin is a generic term for resins containing urethane linkages. The urethane resin may contain other linkages or bonds in the main chain in addition to the urethane linkages, and examples of such a urethane resin include, but are not limited to, polyether-type urethane resins containing ether linkages, polyester-type urethane resins containing ester linkages, and polycarbonate-type urethane resins containing carbonate linkages.

Acrylic resin is a generic term for polymers obtained by polymerizing one or more species of acrylic monomers as a component, such as (meth)acrylic acid and (meth)acrylic acid esters. Acrylic resins may be, but are not limited to, polymers produced from one or more species of acrylic monomer or copolymers produced from one or more species of acrylic monomer and other monomers. Acrylic-vinyl resin, a copolymer of an acrylic monomer and a vinyl monomer, is one example of such a copolymer. The vinyl monomer may be styrene.

The resin content may be 0.02% to 0.20% by mass, for example, 0.08% to 0.12% by mass or 0.06% to 0.16% by mass, relative to the total mass of the ink jet ink composition.

1.5. Method for Producing the Metal Pigment

The metal pigment can be produced by a known process without particular limitation. For example, a metal film is formed on one side of a base sheet by, but not limited to, evaporation, and the metal film is separated from the base sheet and pulverized into scale-like particles to yield a metal pigment. Such evaporation can produce scale-like metal pigment particles having little varying thicknesses and highly flat surfaces and thus enables the metal pigment to exhibit its inherent metallic luster or the like effectively. The thickness of the metal film is the thickness of the scale-like particles of the metal pigment. The metal pigment thus produced may be subjected to classification, if necessary, to adjust the particle size distribution as needed. As an alternative to the evaporation, ion plating or sputtering may be applied.

For producing a metal pigment of aluminum or an aluminum alloy, vapor deposition may be applied to form the thin metal film, followed by pulverizing the metal film, from the viewpoint of enabling the metal pigment to exhibit its gloss or the like more effectively. The processes described here can be used when a metal pigment of relatively thin particles is produced.

The base sheet used for evaporation may be, for example, but is not limited to, a plastic film, such as a polyethylene terephthalate (PET) film. The surface of the base sheet onto which the metal film is formed may be coated with a release agent such as silicone oil or provided with a releasing resin layer in advance to increase the releasability of the film. Examples of the resin for forming the releasing resin layer include, but are not limited to, polyvinyl alcohol, polyvinyl butyral, polyethylene glycol, polyacrylic acid, polymethacrylic acid, polyacrylate esters, polymethacrylate esters, polyacrylamide, cellulose derivatives such as cellulose acetate butyrate, and modified nylon resins.

For removing and pulverizing the metal film, an external force may be applied to the metal film in an organic solvent by, for example, irradiation with ultrasonic waves or agitation with a homogenizer or the like. Examples of the organic solvent used for such operation include alcohols, such as methanol, ethanol, propanol, and butanol; hydrocarbons, such as n-heptane, n-octane, decane, dodecane, tetradecane, toluene, xylene, cymene, durene, indene, dipentene, tetrahydronaphthalene, decahydronaphthalene, and cyclohexylbenzene; ethers, such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl) ether, and p-dioxane; and polar organic solvents, such as propylene carbonate, γ-butyrolactone, N-methyl-2-pyrrolidone, N,N-dimethylformamide, N,N-dimethylacetamide, dimethyl sulfoxide, cyclohexanone, and acetonitrile. The use of such an organic solvent prevents the metal pigment from oxidizing undesirably and reduces the variation of particles in size, shape, and properties.

1.6. Method of Surface Treatment

For surface-treating the metal pigment, a known surface treatment method can be used. For example, a surface treatment agent may be added to a dispersion liquid in which the metal pigment is dispersed in an organic solvent, and the surface treatment agent is bound to the surfaces of the metal pigment particles by ultrasonic wave irradiation. In this instance, the amount of the surface treatment agent can be appropriately adjusted. Also, when ultrasonic waves are applied for the surface treatment, heat may also be applied. The temperature for heating may be 40° C. or more, for example, 50° C. or more. Heat treatment at such a temperature probably forms covalent bonds between the metal pigment and the surface treatment agent to enhance the binding force.

Although the surface treatment agent may act directly on the surfaces of the metal pigment particles for treatment, the metal pigment may be pretreated in advance with an acid or a base and then treated with the surface treatment agent. Such treatment ensures that the surface treatment agent chemically modifies the surfaces of the metal pigment particles to practically produce the effect of the concept of the present disclosure. Additionally, the pretreatment with an acid or a base removes the oxide coating from the metal pigment particles, thereby improving the gloss of the resulting printed product.

Examples of the acid used for the pretreatment include, but are not limited to, protonic acids, such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulphurous acid, nitrous acid, hyponitrous acid, phosphorous acid, and hypophosphorous acid. Also, examples of the base used for the pretreatment include, but are not limited to, sodium hydroxide, potassium hydroxide, and calcium hydroxide.

1.7. Optional Constituents

The ink jet ink composition may optionally contain other constituents. Such optional constituents include, but are not limited to, leveling agents, binders, surfactants, penetration enhancers, moisturizing agents, and chelating agents. These agents may be appropriately added as needed.

2. Ink Jet Printing Method

The ink jet printing method disclosed herein includes an application step of ejecting the ink jet ink composition from an ink jet head with a nozzle diameter L to apply the ink composition onto a printing medium. The ratio $D_{50}/L$ of the volume average particle size $D_{50}$ of the ink jet ink composition to the nozzle diameter L is 0.05 or less. The ink jet printing method may optionally include other steps.

2.1. Application Step

In the application step, the ink jet ink composition (also referred to as the ink) is ejected from an ink jet head onto a printing medium. More specifically, the ink in the pressure-generating chamber of the ink jet head is ejected through nozzles by the operation of the pressure-generating device provided in the ink jet head. Such a way of ejection is also referred to as an ink jet method.

The ink jet head used in the application step may be a line head used for line printing or a serial head used for serial printing.

For line printing with a line head, for example, the printing head having a width more than or equal to the width of the printing medium is fixed to the printing apparatus. While the printing medium is moved in a sub-scanning direction (medium transport direction), ink droplets are ejected through the nozzles of the ink jet head in conjunction with the movement of the printing medium, thus printing an image on the printing medium.

For serial printing with a serial head, an ink jet head is mounted on or in a carriage capable of moving across the width of the printing medium. While the carriage is moved in a main scanning direction (width direction of the printing medium), the ink jet head ejects ink droplets through the nozzles of the ink jet head in conjunction with the movement of the carriage, thus printing an image on the printing medium.

2.2. Primary Heating Step

In an embodiment, the ink jet printing method may further include a heating step of immediately heating the ink attached to the printing medium. In the heating step, the liquid medium of the ink jet ink composition on the printing medium is at least partially dried, at least to the extent of reducing the ink flow. This heating step may be performed by applying the ink onto the printing medium that has been previously heated or by heating the ink immediately after being applied. In some embodiments, the heating step is performed for each ink jet ink composition applied. Also, in some embodiments, heating the ink composition is started within 0.5 s after ink droplets attach to the printing medium. This heating step, which is performed during the application step, is also referred to as the primary heating step.

The primary heating step can rapidly dry the ink composition on the printing medium to reduce ink bleeding. In an embodiment not including the primary heating step, for example, the ink droplets attached to the printing medium do not dry for a while and gather together, consequently causing bleeding and degrading image quality. In particular, aqueous inks and solvent-based inks have this tendency. The ink jet printing method may use other inks, such as black ink, cyan ink, yellow ink, and magenta ink, in combination with the ink jet ink composition disclosed herein. These inks particularly tend to result in degraded image quality. Accordingly, in some embodiments, the printing method includes the primary heating step.

In some embodiments, the heating step may be performed by using an IR heater or a platen heater, blowing warm air over the printing medium from a fan, or microwave irradiation.

Heating in this heating step may be performed before the application step or at the same time as the application step and, in some embodiments, at the same time. The application step can be performed with the heating step in such an order.

In the heating step, the heating temperature of the printing medium and printed product is 30° C. to 50° C. and, in some embodiments, may be 40° C. to 50° C. For heating before ink application, the heating temperature is the surface temperature of the printing medium when ink is applied. For heating after ink application, the heating temperature is the surface temperature of the printing medium when heated.

In view of ease of handling and image quality, the ink composition attached to the printing medium may be immediately dried. However, helping drying causes the ink jet ink composition to dry before sufficient leafing and reduces the gloss of the printed product. Also, when a platen heater is used, the drying causes the metal pigment particles to aggregate together in the nozzles and thus reduces the ejection consistency of the ink composition. Fortunately, the ink composition disclosed herein can produce highly glossy printed products without degrading ejection consistency, even though such heating is performed.

2.3. Post-Application Heating Step

In an embodiment, the printing method may include a post-application heating step (secondary heating step) of heating the printing medium after the application step. The post-application heating step completes printing and dries the printed product to the extent that the printed product can be used. The post-application heating step is intended to sufficiently dry the liquid medium of the ink composition. In some embodiments, the post-application heating step is started more than 0.5 s after the ink is attached to the printing medium. For example, the post-application heating step may be started more than 0.5 s after the completion of all the ink application onto the printing region of the printing medium.

The post-application heating step can be performed using an appropriate heating device as needed. In this instance, the surface temperature of the printing medium may be 45° C. or more, for example, 50° C. or more. The upper limit of the surface temperature may be, but is not limited to, 120° C. or less. In some embodiments, the upper limit of the surface temperature is 75° C. or less, 70° C. or less, or 60° C. or less. Additionally, the heating temperature is desirably lower than or equal to the softening point of the base material of the printing medium.

2.4. Printing Medium

The printing medium used in an embodiment of the present disclosure may be absorbent, poorly absorbent, or not absorbent without particular limitation.

Absorbent printing media include, but are not limited to, plain paper, such as electrophotographic paper that is highly permeable to ink; ink jet paper having an ink-absorbent layer made of silica particles or alumina particles or an ink-absorbent layer of a hydrophilic polymer, such as polyvinyl alcohol (PVA) or polyvinyl pyrrolidone (PVP); and art paper, coated paper, and cast-coated paper that are used for ordinary offset printing and relatively less permeable to ink.

Non-absorbent printing media include, but are not limited to, plastic films or plates, such as those of polyvinyl chloride, polyethylene, polypropylene, polyethylene terephthalate (PET), polycarbonate, polystyrene, and polyurethane; metal plates, such as those of iron, silver, copper, and aluminum; metal plates or plastic films on which such a metal is deposited; alloy plates made of stainless steel, brass, or the like; and paper sheets coated with (bonded to) a plastic film, such as that of polyvinyl chloride, polyethylene, polypropylene, polyethylene terephthalate (PET), polycarbonate, polystyrene, or polyurethane.

Poorly absorbent printing media are media with a printing surface having the second lowest absorbency after the non-absorbent recording medium. A poorly absorbent printing medium may be provided with a coating layer (receiving layer) at the surface of the medium to receive liquid, and one example of such a medium with a paper base material is book-printing paper. The coating layer is difficult to absorb ink; one example is a layer formed by applying particles of an inorganic compound with a binder.

Non-absorbent or poorly absorbent printing media do not or hardly absorb liquid. For example, a poorly absorbent or non-absorbent printing medium may exhibit a water absorption of 10 mL/m$^2$ or less for a period of 30 ms$^{1/2}$ from the beginning of contact with water when measured by the Bristow method.

The Bristow method is most commonly used for measuring liquid absorption for a short time, and Japan Technical Association of the Pulp and Paper Industry (JAPAN TAPPI) officially adopts this method. Details of this method are specified in Standard No. 51 (Paper and Paperboard-Liquid Absorption Test Method-Bristow's Method (in Japanese)) of JAPAN TAPPI Paper and Pulp Test Methods edited in 2000 (in Japanese).

In contrast, absorbent printing media refer to those not belonging to the category of poorly or non-absorbent printing media.

The printing medium may be in the form of, but not limited to, a sheet, a plate, or any other object.

3. Ink Jet Printing Apparatus

The printing apparatus used in the printing method disclosed herein includes an ink jet head from which the ink composition is ejected.

3.1. General Structure of the Apparatus

FIG. 1 is a schematic sectional view of a printing apparatus. As depicted in FIG. 1, the printing apparatus 1 includes an ink jet head 2, an IR heater 3, a platen 4, a secondary heater 5, a cooling fan 6, a preheater 7, and an air-feeding fan 8. The ink jet head 2 is mounted on or in a carriage (not shown) and applies ink onto the printing medium M while moving across the printing medium M in the frontward and backward directions of the figure (main scan). The platen 4 is provided with a platen heater (not shown). The printing apparatus 1 includes a control section (not shown) to control the devices, units, or the like of the apparatus. Also, the ink jet head 2 receives ink fed from an ink container (not shown).

3.2. Structure of Ink Jet Head

The ink jet head 2 is configured to eject the ink composition onto the printing medium M through nozzles thereof, thus printing on the printing medium M. The ink jet head 2 depicted in FIG. 1 is of a serial type that applies ink onto the printing medium M while moving across the printing medium M in the main scanning directions a plurality of times. The ink jet head 2 is mounted on or in a carriage (not shown). The ink jet head 2 passes across the printing medium M in the main scanning directions a plurality of times associated with the operation of a carriage transfer mechanism that transfers the carriage in the width directions of the printing medium M (frontward and backward directions of the figure). The width directions of the printing medium are the main scanning directions in which the ink jet head 2 scans the printing medium M. A pass of the printing head 2 in the main scanning directions is referred to as a main scan.

In the illustrated embodiment, the main scanning directions are directions in which the carriage equipped with the ink jet head 2 moves. In FIG. 1, the main scanning directions intersect the sub-scanning direction indicated by arrow SS, which is the direction in which the printing medium M is transported or fed. By repeating the main scan by the printing head 2 and the transport of the printing medium M in the sub-scanning direction, the printing medium M is printed.

Ejection from the ink jet head 2 may be performed by a known technique. For example, the ink jet head 2 ejects droplets in response to vibration of piezoelectric elements, that is, ejects droplets formed by mechanical deformation of electrostrictive elements.

3.3. Primary Heating Mechanism

The printing apparatus 1 may include a primary heating mechanism configured to primarily heat the printing medium M when ink is ejected onto the printing medium from the ink jet head 2. The primary heating mechanism may be based on heat conduction, blowing, heat radiation, or the like. The heat conduction type conducts heat to the printing medium M from a member in contact with the printing medium. A platen heater is an example of the heat conduction type. In the embodiment depicted in FIG. 1, the platen 4 is provided with a platen heater (not shown). A blowing type blows normal-temperature or warm air on the printing medium to dry the ink. A blowing fan is an example of the blowing type. A heat radiation type radiates heat-generating radiation to the printing medium to heat the printing medium. IR radiation is an example. A heater similar to the platen heater may be provided immediately downstream of the platen 4 in the SS direction. Such primary heating mechanisms may be used individually or in combination.

In an embodiment, the primary heating mechanism includes an IR heater 3 and a platen heater.

The IR heater 3 is operable to heat the printing medium M by emitting infrared radiation from the side on which the ink jet head 2 is located. In this instance, the ink jet head 2 is likely to be heated simultaneously with the printing medium M. However, the IR heater can efficiently heat the printing medium M without the influence of the printing medium thickness, compared to the case where the platen heater or the like heats the printing medium M from the rear side. A fan (for example, the air-feeding fan 8) may be provided for applying warm air or a wind having the same temperature as the ambient temperature to the printing medium M to dry the ink on the printing medium M.

The platen heater can heat the printing medium M via the platen 4 at a position opposite the ink jet head 2. The platen heater, which heats the printing medium M by heat conduction, is optionally used in the ink jet printing method.

The printing apparatus 1 may also include a preheater 7 to previously heat the printing medium M before ink is applied onto the printing medium M.

3.4. Post-Application Heating Mechanism

The printing apparatus may include a post-application heating mechanism to heat the printing medium to dry and fix the ink.

The secondary heater 5 used in the post-application mechanism dries and solidifies the ink attached to the printing medium M. The secondary heater 5 heats the image printed on the printing medium M to rapidly evaporate the water and other solvents from the ink of the image, so that the resin contained in the ink forms an ink coating film. Thus, the resulting ink coating film is firmly fixed or adheres to the printing medium M, thus forming a high-quality image in a short time. The printing apparatus 1 may include the cooling fan 6. By cooling the ink on the printing medium M with the cooling fan 6 after drying, the ink composition can form an ink coating film on the printing medium M with high adhesion.

3.5. Other Constituents

The printing apparatus 10 depicted in FIG. 1 is a serial printer for serial printing. The printing apparatus may be a line printer for line printing.

The line head has a nozzle line in which a plurality of nozzles are aligned in the width direction of the printing medium, and whose length is more than or equal to the width of the printing medium M. Thus, the line head can print an image on the printing medium M in the width direction of the printing medium at one time. The line head can print in one scan. After a scan performed by transporting the printing medium in one direction, the printing medium may be transported in the opposite direction to the former transport direction for two or more scans.

The printing medium may be scanned by a head at a fixed position to the printing medium to be transported or by a head moving across the printing medium fixed to the platen region.

A printing apparatus for line printing may have the same structure depicted in FIG. 1 except that the ink jet head 2 is replaced with a line head. More specifically, in such a printing apparatus, heating mechanisms, such as the air-feeding fan 8 and the IR heater 3 provided above the ink jet head 2 in FIG. 1, the platen, and the preheater 7, can be disposed above or below the line head. Also, the secondary heater 5 that is a post-application heating mechanism depicted in FIG. 1 and the cooling fan 6 may be provided.

3.6. Details of Ink Jet Head

Figure 2:
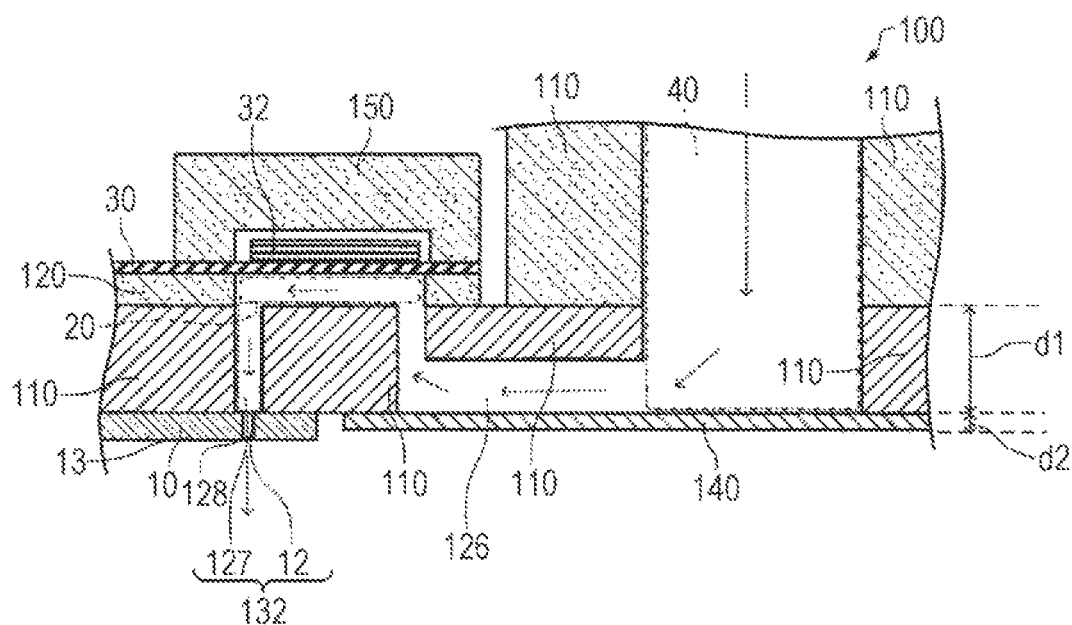
FIG. 2 is a sectional view of a main portion of an ink jet head used in an embodiment of the present disclosure.

FIG. 2 is a schematic sectional view of the main portion of an ink jet head 100 of a printing apparatus. FIG. 2 illustrates the ink flow, indicated by broken lines with an arrow, from an ink supply chamber 40 to a nozzle opening 12 when ink is ejected.

In FIG. 2, a piezoelectric element 32 is illustrated in a simplified manner. The ink jet head 100 includes a communication plate 110 and a cover 150.

As depicted in FIG. 2, the ink jet head 100 includes a nozzle plate 10 in which a plurality of nozzle openings 12 are formed, a plurality of pressure chambers 20 communicating with the respective nozzle openings 12, vibration plates 30 that individually vary the volumetric capacity of the corresponding pressure chambers 20, and a ink supply chamber 40 from which ink is supplied to the pressure chambers 20. Pluralities of the above components or members are arranged in the backward direction of the figure, and FIG. 2 illustrates a section of a set of such components or members.

The nozzle plate 10 has a plurality of nozzle openings 12 through which ink is ejected, and the nozzles are arranged in a row to define a nozzle face 13 at the surface of the nozzle plate 10. The number of nozzle openings formed in the nozzle plate 10 is not particularly limited. The diameter of the nozzle opening 12 is the nozzle diameter L.

The ink jet head 100 includes a pressure chamber substrate 120 in which the pressure chambers 20 are formed. As depicted in FIG. 2, the communication plate 110, which is used as a flow channel substrate, is disposed between the pressure chamber substrate 120 and the nozzle plate 10. The communication plate 110 defines spaces between the nozzle plate 10 and the pressure chamber substrate 120 to form an ink supply chamber 40 (liquid storage section), a supply port 126 communicating with the ink supply chamber 40, and the pressure chambers 20 communicating with the supply port 126. The ink supply chamber 40, the supply port 126, and the pressure chambers 20 are partitioned by the nozzle plate 10, the communication plate 110, the pressure chamber substrate 120, and the vibration plates 30.

The communication plate 110 has communication holes 127 continuing from the pressure chamber 20 to the nozzle openings 12. An ink ejection opening 128 is formed at the end of the communication hole 127 that is formed in the surface of the communication plate 110 in contact with the nozzle plate 10. The ejection opening 128 communicates with the corresponding nozzle opening 12 formed in the nozzle plate 10.

The vibration plate 30 is in contact with the pressure chamber substrate 120, and the piezoelectric element 32 is provided in contact with the vibration plate 30. The piezoelectric element 32 is electrically connected to a piezoelectric element driving circuit (not shown) to operate (for vibration or deformation) according to the signal from the piezoelectric element driving circuit. The vibration plate 30 is deformed by the behavior of the piezoelectric member 32 to vary the volumetric capacity of the pressure chamber 20, thus varying the internal pressure of the pressure chamber 20. The piezoelectric element 32 may be, but is not limited to, an electromechanical conversion element, which is a type of element that is deformed by voltage application.

The ink jet head 100 further includes a compliance sheet 140 and a cover 150 housing the piezoelectric elements 32, as the members defining part of the ink flow paths. The compliance sheet 140 and the communication plate 110 define the supply port 126 communicating with the ink supply chamber 40. The compliance sheet 140 is a flexible elastic film and functions as a damper for ejecting and feeding ink. Also, when ink expands in volume, the compliance sheet 140 deforms to reduce damage to the ink jet head 100.

In the present embodiment, the ink supply chamber 40, the supply port 126, the pressure chamber 20, and the communication hole 127 are individually described. However, they all are portions of a liquid flow channel, and the flow channel can be designed as desired, provided that the pressure chamber 20 is formed.

The pressure chamber 20 in the above-described structure is a space defined by the communication plate 110, the pressure chamber substrate 120, and the vibration plate 30, and in which the supply port 126, the communication hole 127, the ejection opening 128, and the nozzle opening 12 do not lie. In other words, the pressure chamber 20 is a space opposing the portions involved in applying pressure to the ink, including the vibration plate 30, the pressure chamber substrate 120, the communication plate 110 and spaced adjacent to that space, whose sectional area at a section perpendicular to the ink moving direction is equal to the sectional area of that space. The volumetric capacity of the pressure chamber 20 is the volume of these spaces. Thus, the pressure chamber 20 is a space whose volumetric capacity is varied by the displacement of the vibration plate 30 and does not include the narrowed flow path or the like communicating with the space. The volumetric capacity of the pressure chamber may be 1000 pL to 4000 pL, for example, 1500 pL to 3700 pL or 2000 pL to 3300 pL. This volumetric capacity is that the value per pressure chamber.

In the ink jet head, the distance from the pressure chamber to a nozzle is that from the pressure chamber end at which the ink flow turns toward a nozzle openings to the tip of the nozzle opening. In the embodiment depicted in FIG. 2, the distance from the pressure chamber to the nozzle in the ink jet head is the distance between the pressure chamber 20 and the nozzle opening 12 and is equivalent to the sum of the thickness dl of the communication plate 110 and the thickness of the nozzle plate 10.

The distance from the pressure chamber to the nozzle may be, but is not limited to, 5 mm or less. In particular, the distance may be 0.2 mm to 4 mm, for example, 0.5 mm to 3 mm, 0.7 mm to 2 mm, or 0.8 mm to 1.5 mm. When the distance from the pressure chamber to the nozzle in the ink jet head is in such a range, the pressure chamber and nozzle positions in the ink jet head can be more freely designed desirably.

An ink jet head with a narrow flow path, as depicted in FIG. 2, from the pressure chamber to the nozzle is likely to cause the following problem.

When the ink flows through a narrow flow path like a thin tube, scale-like metal pigment particles move with the surfaces of the scales parallel to the direction in which the ink moves. Consequently, the ink can easily flow through the flow path. This produces a positive effect on the ejection consistency. However, once the dispersion of the metal pigment becomes unstable, the scale-like metal pigment particles tend to overlap each other at their surfaces and aggregate, forming coarse particles. Coarse particles formed by scale-like metal pigment particles stacked on their surfaces do not easily allow their surface direction to turn to the direction in which the ink moves, not smoothly moving. Additionally, the appearance of the particles is no longer scale-like. In such a case, the ink composition does not smoothly flow in the ink jet head. The flow path from the pressure chamber to the nozzle in the ink jet head is narrow, like a thin tube. This is probably the cause of the difficulty in smooth flow of the ink composition.

Fortunately, the ink composition used in the printing method disclosed herein contains a metal pigment surface-treated with a specific phosphorus-containing surface treatment agent to reduce the likelihood of fluidity degradation and ensure consistent ejection at high ejection frequency.

EXAMPLES

1. Preparation of Ink Jet Ink Compositions

Constituents of the individual compositions presented in Tables 1 to 3 were placed into a mixing tank and mixed and stirred, followed by filtration. Thus, the ink jet ink compositions of the Examples were prepared. The values of the constituents in Tables 1 to 3 are expressed by mass percent unless otherwise specified. The values for the metal pigment are their solid contents in mass percent.

TABLE 1

| Solvent-based composition | | Example | | | | | | |
|---|---|---|---|---|---|---|---|---|
| | | 1 | 2 | 3 | 4 | 5 | 6 | 7 |
| Printing conditions | Nozzle diameter L (μm) | 20.0 | 20.0 | 20.0 | 20.0 | 20.0 | 20.0 | 20.0 |
| | Heating temperature (° C.) | 45 | 45 | 45 | 45 | 45 | 45 | 45 |
| Pigment properties | $D_{50}$ (μm) | 0.2 | 0.4 | 0.5 | 0.5 | 1.0 | 1.0 | 0.4 |
| | Z (nm) | 10 | 20 | 15 | 30 | 20 | 50 | 20 |
| | $D_{50}/Z$ | 20 | 20 | 33 | 17 | 50 | 20 | 20 |
| | $D_{50}/L$ | 0.010 | 0.020 | 0.025 | 0.025 | 0.050 | 0.050 | 0.020 |
| Ink composition | Pigment | Aluminum-based pigment | 2 | 2 | 2 | 2 | 2 | 2 | 2 |
| | Surface treatment agent | Cetyl phosphate | | | | | | | 0.3 |
| | | Octadecyl phosphate | | | | | | | |
| | | Octadecylphosphonic acid | 0.3 | 0.3 | 0.3 | 0.3 | 0.3 | 0.3 | |
| | | Tetracosyl phosphate | | | | | | | |
| | | Tridecyl phosphate | | | | | | | |
| | | Dodecyl phosphate | | | | | | | |
| | | FHP | | | | | | | |
| | | Octadecyltrimethoxysilane | | | | | | | |
| | Resin | PARALOID B60 | 0.1 | 0.1 | 0.1 | 0.1 | 0.1 | 0.1 | 0.1 |
| | Organic solvent | BTGH | 10 | 10 | 10 | 10 | 10 | 10 | 10 |
| | | γBL | 2.5 | 2.5 | 2.5 | 2.5 | 2.5 | 2.5 | 2.5 |
| | | DEDG | 85.1 | 85.1 | 85.1 | 85.1 | 85.1 | 85.1 | 85.1 |
| | Total | | 100 | 100 | 100 | 100 | 100 | 100 | 100 |
| Evaluation | Gloss | | C | B | A | B | A | C | C |
| | Ejection consistency | | A | A | A | A | C | C | A |
| | Storage stability | | B | A | A | A | A | A | B |

Example

TABLE 1-continued

| | Solvent-based composition | 8 | 9 | 10 | 11 | 12 | 13 |
|---|---|---|---|---|---|---|---|
| Printing conditions | Nozzle diameter L (μm) | 20.0 | 20.0 | 20.0 | 30.0 | 10.0 | 20.0 |
| | Heating temperature (° C.) | 45 | 45 | 45 | 45 | 45 | 40 |
| Pigment properties | $D_{50}$ (μm) | 0.4 | 0.4 | 0.4 | 1.0 | 0.4 | 0.4 |
| | Z (nm) | 20 | 20 | 20 | 20 | 20 | 20 |
| | $D_{50}/Z$ | 20 | 20 | 20 | 50 | 20 | 20 |
| | $D_{50}/L$ | 0.020 | 0.020 | 0.020 | 0.033 | 0.040 | 0.020 |
| Ink composition | Pigment | Aluminum-based pigment | 2 | 2 | 2 | 2 | 2 | 2 |
| | Surface treatment agent | Cetyl phosphate | | | | | | |
| | | Octadecyl phosphate | 0.3 | | | | | |
| | | Octadecylphosphonic acid | | | 0.2 | 0.3 | 0.3 | 0.3 |
| | | Tetracosyl phosphate | | 0.3 | | | | |
| | | Tridecyl phosphate | | | | | | |
| | | Dodecyl phosphate | | | | | | |
| | | FHP | | | | | | |
| | | Octadecyltrimethoxysilane | | | | | | |
| | Resin | PARALOID B60 | 0.1 | 0.1 | 0.1 | 0.1 | 0.1 | 0.1 |
| | Organic solvent | BTGH | 10 | 10 | 10 | 10 | 10 | 10 |
| | | γBL | 2.5 | 2.5 | 2.5 | 2.5 | 2.5 | 2.5 |
| | | DEDG | 85.1 | 85.1 | 85.2 | 85.1 | 85.1 | 85.1 |
| | Total | | 100 | 100 | 100 | 100 | 100 | 100 |
| Evaluation | Gloss | | B | A | C | A | B | A |
| | Ejection consistency | | A | A | B | B | B | A |
| | Storage stability | | B | A | B | A | A | A |

TABLE 2

| | | Example | Comparative Example | | | | |
|---|---|---|---|---|---|---|---|
| | Solvent-based composition | 14 | 1 | 2 | 3 | 4 | 5 |
| Printing conditions | Nozzle diameter L (μm) | 20.0 | 30.0 | 30.0 | 20.0 | 20.0 | 20.0 |
| | Heating temperature (° C.) | 55 | 45 | 45 | 45 | 45 | 45 |
| Pigment properties | $D_{50}$ (μm) | 0.4 | 3.0 | 2.0 | 0.4 | 0.1 | 0.3 |
| | Z (nm) | 20 | 50 | 30 | 30 | 10 | 20 |
| | $D_{50}/Z$ | 20 | 60 | 67 | 13 | 10 | 15 |
| | $D_{50}/L$ | 0.020 | 0.100 | 0.067 | 0.020 | 0.005 | 0.015 |
| Ink composition | Pigment | Aluminum-based pigment | 2 | 2 | 2 | 2 | 2 | 2 |
| | Surface treatment agent | Cetyl phosphate | | | | | | |
| | | Octadecyl phosphate | | | | | | |
| | | Octadecylphosphonic acid | 0.3 | 0.3 | 0.3 | 0.3 | 0.3 | 0.3 |
| | | Tetracosyl phosphate | | | | | | |
| | | Tridecyl phosphate | | | | | | |
| | | Dodecyl phosphate | | | | | | |
| | | FHP | | | | | | |
| | | Octadecyltrimethoxysilane | | | | | | |
| | Resin | PARALOID B60 | 0.1 | 0.1 | 0.1 | 0.1 | 0.1 | 0.1 |
| | Organic solvent | BTGH | 10 | 10 | 10 | 10 | 10 | 10 |
| | | γBL | 2.5 | 2.5 | 2.5 | 2.5 | 2.5 | 2.5 |
| | | DEDG | 85.1 | 85.1 | 85.1 | 85.1 | 85.1 | 85.1 |
| | Total | | 100 | 100 | 100 | 100 | 100 | 100 |
| Evaluation | Gloss | | C | B | A | D | D | D |
| | Ejection consistency | | B | D | D | A | A | A |
| | Storage stability | | A | A | A | A | B | A |

| | | Comparative Example | | | | | |
|---|---|---|---|---|---|---|---|
| | Solvent-based composition | 6 | 7 | 8 | 9 | 10 | 13 |
| Printing conditions | Nozzle diameter L (μm) | 20.0 | 20.0 | 20.0 | 20.0 | 20.0 | 10.0 |
| | Heating temperature (° C.) | 45 | 45 | 45 | 45 | 45 | 45 |
| Pigment properties | $D_{50}$ (μm) | 0.4 | 0.4 | 0.4 | 0.4 | 0.2 | 1.0 |
| | Z (nm) | 20 | 20 | 20 | 20 | 20 | 20 |
| | $D_{50}/Z$ | 20 | 20 | 20 | 20 | 10 | 50 |
| | $D_{50}/L$ | 0.020 | 0.020 | 0.020 | 0.020 | 0.010 | 0.100 |
| Ink composition | Pigment | Aluminum-based pigment | 2 | 2 | 2 | 2 | 2 | 2 |
| | Surface treatment agent | Cetyl phosphate | | | | | | |
| | | Octadecyl phosphate | | | | | | |
| | | Octadecylphosphonic acid | | | | | | 0.3 |
| | | Tetracosyl phosphate | | | | | | |

TABLE 2-continued

|  |  |  |  |  |  |  |  |
|---|---|---|---|---|---|---|---|
|  | Tridecyl phosphate | 0.3 |  |  |  |  |  |
|  | Dodecyl phosphate |  | 0.3 |  |  |  |  |
|  | FHP |  |  | 0.3 |  | 0.3 |  |
|  | Octadecyltrimethoxysilane |  |  |  | 0.3 |  |  |
| Resin | PARALOID B60 | 0.1 | 0.1 | 0.1 | 0.1 | 0.1 | 0.1 |
| Organic solvent | BTGH | 10 | 10 | 10 | 10 | 10 | 10 |
|  | γBL | 2.5 | 2.5 | 2.5 | 2.5 | 2.5 | 2.5 |
|  | DEDG | 85.1 | 85.1 | 85.1 | 85.1 | 85.1 | 85.1 |
| Total |  | 100 | 100 | 100 | 100 | 100 | 100 |
| Evaluation | Gloss | D | D | D | D | D | A |
|  | Ejection consistency | D | D | D | D | D | D |
|  | Storage stability | C | C | C | C | C | A |

TABLE 3

|  |  | Example |  |  |  |  |  |
|---|---|---|---|---|---|---|---|
| Aqueous composition |  | 15 | 16 | 17 | 18 | 19 | 20 |
| Printing conditions | Nozzle diameter L (μm) | 20.0 | 20.0 | 20.0 | 20.0 | 20.0 | 20.0 |
|  | Heating temperature (° C.) | 45 | 45 | 45 | 45 | 45 | 45 |
| Pigment properties | $D_{50}$ (μm) | 0.4 | 0.5 | 1.0 | 0.4 | 0.4 | 0.4 |
|  | Z (nm) | 20 | 15 | 20 | 20 | 20 | 20 |
|  | $D_{50}/Z$ | 20 | 33 | 50 | 20 | 20 | 20 |
|  | $D_{50}/L$ | 0.020 | 0.025 | 0.050 | 0.020 | 0.020 | 0.020 |
| Ink composition | Pigment — Aluminum-based pigment | 2 | 2 | 2 | 2 | 2 | 2 |
|  | Surface treatment agent — Cetyl phosphate |  |  |  | 0.3 |  |  |
|  | Octadecyl phosphate |  |  |  |  | 0.3 |  |
|  | Octadecylphosphonic acid | 0.3 | 0.3 | 0.3 |  |  |  |
|  | Tetracosyl phosphate |  |  |  |  |  | 0.3 |
|  | Tridecyl phosphate |  |  |  |  |  |  |
|  | Dodecyl phosphate |  |  |  |  |  |  |
|  | FHP |  |  |  |  |  |  |
|  | Octadecyltrimethoxysilane |  |  |  |  |  |  |
| Resin | RESAMINE D1030 | 0.1 | 0.1 | 0.1 | 0.1 | 0.1 | 0.1 |
| Organic solvent | PG | 10 | 10 | 10 | 10 | 10 | 10 |
|  | 1,2-Hexanediol | 1 | 1 | 1 | 1 | 1 | 1 |
| Water | Water | 87 | 87 | 87 | 87 | 87 | 87 |
| Total |  | 100 | 100 | 100 | 100 | 100 | 100 |
| Evaluation | Gloss | B | A | A | C | B | A |
|  | Ejection consistency | A | A | C | A | A | A |
|  | Storage stability | B | B | B | B | B | B |

|  |  | Comparative Example |  |  |  |  |  |  |
|---|---|---|---|---|---|---|---|---|
| Aqueous composition |  | 12 | 13 | 14 | 15 | 16 | 17 | 18 |
| Printing conditions | Nozzle diameter L (μm) | 30.0 | 20.0 | 20.0 | 20.0 | 20.0 | 20.0 | 10.0 |
|  | Heating temperature (° C.) | 45 | 45 | 45 | 45 | 45 | 45 | 45 |
| Pigment properties | $D_{50}$ (μm) | 2.0 | 0.3 | 0.4 | 0.4 | 0.4 | 0.4 | 1.0 |
|  | Z (nm) | 30 | 20 | 20 | 20 | 20 | 20 | 20 |
|  | $D_{50}/Z$ | 67 | 15 | 20 | 20 | 20 | 20 | 50 |
|  | $D_{50}/L$ | 0.067 | 0.015 | 0.020 | 10.020 | 0.020 | 0.020 | 0.100 |
| Ink composition | Pigment — Aluminum-based pigment | 2 | 2 | 2 | 2 | 2 | 2 | 2 |
|  | Surface treatment agent — Cetyl phosphate |  |  |  |  |  |  |  |
|  | Octadecyl phosphate |  |  |  |  |  |  |  |
|  | Octadecylphosphonic acid | 0.3 | 0.3 |  |  |  |  | 0.3 |
|  | Tetracosyl phosphate |  |  |  |  |  |  |  |
|  | Tridecyl phosphate |  |  | 0.3 |  |  |  |  |
|  | Dodecyl phosphate |  |  |  | 0.3 |  |  |  |
|  | FHP |  |  |  |  | 0.3 |  |  |
|  | Octadecyltrimethoxysilane |  |  |  |  |  | 0.3 |  |
| Resin | RESAMINE D1030 | 0.1 | 0.1 | 0.1 | 0.1 | 0.1 | 0.1 | 0.1 |
| Organic solvent | PG | 10 | 10 | 10 | 10 | 10 | 10 | 10 |
|  | 1,2-Hexanediol | 1 | 1 | 1 | 1 | 1 | 1 | 1 |
| Water | Water | 87 | 87 | 87 | 87 | 87 | 87 | 87 |
| Total |  | 100 | 100 | 100 | 100 | 100 | 100 | 100 |
| Evaluation | Gloss | A | D | D | D | D | D | A |
|  | Ejection consistency | D | A | D | D | D | D | D |
|  | Storage stability | B | B | C | C | C | C | B |

The abbreviations and details of the materials in the Table are as follows.

Metal Pigment

Metal pigment prepared as described below.

A releasing resin solution in acetone was applied onto a polyethylene terephthalate (PET) base sheet with a roll coater to form a release layer. Then, an aluminum layer was formed to the thickness of the corresponding Example on the release layer in a vacuum deposition apparatus. The thickness of the layer was controlled by controlling the amount of deposition.

The resulting PET base sheet with the aluminum layer was irradiated with ultrasonic waves in a tetrahydrofuran (THF) bath to remove the aluminum layer from the PET substrate and pulverize the aluminum layer, thus obtaining a dispersion liquid in which aluminum particles are dispersed in THF. The dispersion liquid was subjected to centrifugation to remove THF, and an appropriate amount of diethylene glycol diethyl ether was added to the aluminum particles to yield an aluminum pigment suspension with aluminum content of 5%.

The resulting aluminum pigment suspension (5% aluminum and diethylene glycol diethyl ether) was further pulverized to a desired average particle size in a high-power ultrasonic circulation mill (20 kHz), thus obtaining an aluminum pigment having a corresponding particle size ($D_{50}$) presented in Tables 1 to 3.

Then, Jeffamine M2070 was added as a poly(oxyethylene/oxy propylene)amine dispersant to the aluminum pigment suspension in a proportion of 5% to the amount of aluminum. The mixture was subjected to ultrasonic treatment at 55° C. for 1 hour to break aggregates and, thus, the aluminum pigment was dispersed to form primary particles.

One of the surface treatment agents presented below was added into the corresponding aluminum pigment suspension, in which the pigment particles were dispersed to form primary particles, in the mass ratio to the amount of aluminum pigment presented for the corresponding Example in the Tables. The mixture was subjected to ultrasonic treatment at 55° C. for 3 hours to allow the surface treatment agent to react with the surfaces of the pigment particles and was further heat-treated under different conditions. Thus, an aluminum dispersion liquid whose liquid medium was an organic solvent was prepared. In the Examples, a portion of the dispersion liquid was taken for an examination and from which diethylene glycol diethyl ether was removed by centrifugation. The check of the diethylene glycol diethyl ether exhibited the absence of the surface treatment agent in the diethylene glycol diethyl ether. This suggests that the surface treatment agent is attached to the metal pigment. For the Examples of aqueous compositions, the aluminum dispersion liquid was subjected to centrifugation to remove the organic solvent, and water was substituted for the organic solvent to obtain an aluminum dispersion liquid whose liquid medium was water. The aluminum dispersion liquid was mixed with other constituents presented in the corresponding Table to yield an ink composition presented in the Table.

Resin

PARALOID B60: acrylic resin, "PARALOID 60B" produced by The Dow Chemical Company.

RESAMINE D1030: aqueous urethane resin, "RESAMINE D1030" produced by Dainichiseika Color & Chemicals Mfg. Co., Ltd.

Organic Solvents

BTGH: Tetraethylene glycol monobutyl ether

γBL: γ-Butyrolactone,

DEDG: Diethylene glycol diethyl ether

PG: Propylene glycol 1,2-Hexanediol

Surface Treatment Agent

Cetyl phosphate: Surface treatment agent that is a mixture of formula (2) compounds whose $R^2$ is the n-hexadecyl (n-cetyl) group and in which a is 1 and 2, respectively.

Octadecyl phosphate: Surface treatment agent that is a mixture of formula (2) compounds whose $R^2$ is the n-octadecyl group and in which a is 1 and 2, respectively.

Octadecylphosphonic acid: Surface treatment agent that is the formula (1) compound whose $R^1$ is the n-octadecyl group.

Tetracosyl phosphate: Surface treatment agent that is a mixture of formula (2) compounds whose $R^2$ is the n-tetracosyl group and in which a is 1 and 2, respectively.

Tridecyl phosphate: Surface treatment agent that is a mixture of formula (2) compounds whose $R^2$ is the n-tridecyl group and in which a is 1 and 2, respectively.

Dodecyl phosphate: Surface treatment agent that is a mixture of formula (2) compounds whose $R^2$ is the n-dodecyl group and in which a is 1 and 2, respectively.

FHP: (CHEMINOX FHP-2-OH (product name), 2-(Perfluorohexyl)ethyl phosphonic acid produced by Unimatec Co., LTD.

Octadecyltrimethoxysilane

2. Measurements and Evaluation 2.1. Shape

The volume average particle size ($D_{50}$) of the metal pigment was measured with a laser diffraction/scattering particle size distribution analyzer Microtrac MT-3300 manufactured by MicrotracBEL Corp. The average thickness Z of the metal pigment particles was measured by atomic force microscopy using a NanoNavi E-Sweep (manufactured by Hitachi High-Tech Science Corporation). All the metal pigments were in the form of scale-like particles.

2.2. Gloss

A printer modified from SC-S80650 manufactured by Seiko Epson was prepared as the printing apparatus. The nozzle line of the ink jet head had 360 nozzles with a nozzle density of 360 npi. The ink jet head was charged with an ink, and the driving waveform of the ink jet head was optimized so that the ink could be optimally ejected. The ink jet head was configured as depicted in FIG. 2. The distance from the pressure chamber to the nozzle was 1 mm, and the volumetric capacity of the pressure chamber was 2900 pL. The platen heater was controlled during printing to increase the surface temperature of the printing medium on the platen to the corresponding heating temperature (° C.) in Tables 1 to 3. At the same time, the secondary heater was operated for the post-application heating step. The surface temperature of the ink-applied medium in the post-application heating was controlled to 50° C. A polyvinyl chloride film (Mactac 5829R manufactured by Mactac) was used as the medium to which ink was applied was used.

The amount of ink applied for printing a pattern was controlled to 3 mg/inch², and the printing resolution was 1440 dpi×1440 dpi. Printing tests were conducted under such conditions. The resulting printed products were allowed to stand in a thermostatic oven (at a temperature of 40° C. and a humidity of 100%) for 5 days. Then, the printed products were removed from the thermostatic oven, and the gloss level of the printed portion was measured at a tilt angle of 60° with a glossmeter MINOLTA MULTI GLOSS 268. Thus, the gloss of the solvent-based compositions and aqueous compositions was evaluated according to the following criteria. Printed products with higher gloss levels tend to exhibit more excellent metallic luster. The evaluation results are presented in Tables 1 to 3.

Evaluation criteria for the solvent-based compositions are as follows:
A: Gloss level was 350 or more.
B: Gloss level was 300 to less than 350.
C: Gloss level was 270 to less than 300.
D: Gloss level was less than 270.

Evaluation criteria for the aqueous compositions are as follows:
A: Gloss level was 250 or more.
B: Gloss level was 200 to less than 250.
C: Gloss level was 150 to less than 200.
D: Gloss level was less than 150.

2.3. Ejection Consistency

The printing apparatus was set in a thermostatic oven and subjected to continuous printing test for 5 hours at a temperature of 40° C. and a humidity of 80%. After the printing test, the nozzles were checked for ejection failure, that is, non-ejection or deviation in the position of ink droplets. For the deviation, when the position of the droplets deviated 30% to the distance between nozzles from the proper position, the ejection consistency was determined to be poor. Thus, the ejection consistency of the solvent-based compositions and aqueous compositions was evaluated according to the following criteria. The test was intended to examine the ejection consistency in printing. The evaluation results are presented in Tables 1 to 3.

Evaluation criteria for the solvent-based compositions are as follows:
A: The number of ejection failed nozzles is less than 1% of all ejection nozzles.
B: The number of ejection failed nozzles is 1% to less than 3% of all ejection nozzles.
C: The number of ejection failed nozzles is 3% or more of all ejection nozzles.

Evaluation criteria for aqueous compositions are as follows:
A: The number of ejections failed nozzles is less than 2% of all ejection nozzles.
B: The number of ejection failed nozzles is 2% to less than 5% of all ejection nozzles.
C: The number of ejection failed nozzles is 5% or more of all ejection nozzles.

2.4. Storage Stability

The ink jet ink compositions prepared above were individually placed into a screw tube and allowed to stand in a thermostatic oven of 45° C. with a lid put on the screw tube for 10 days. The volume average particle size $D_{50}$ at 20° C. before standing in a thermostatic oven and the volume average particle size at 20° C. after standing for 5 days were measured with a particle size distribution analyzer, and the rate of change in particle size was calculated. The storage stability was evaluated according to the following criteria. The evaluation results are presented in Tables 1 to 3.

Criteria are as follows:
A: The rate of increase in volume average particle size $D_{50}$ was 1% or less.
B: The rate of increase in volume average particle size $D_{50}$ was more than 1% to 3%.
C: The rate of increase in volume average particle size $D_{50}$ was more than 3%.

3. Evaluation Results

Comparison between Examples 1 to 20 according to the present disclosure and Comparative Examples 1 to 18, not satisfying the requirements of the ink jet ink composition of the present disclosure showed that the ink jet ink compositions according to the present disclosure were superior to those of Comparative Examples 1 to 18 in gloss, ejection consistency, and storage stability.

The Examples in which the ink contains a metal pigment that was treated with a compound represented by either formula (1) or formula (2) and had the following properties all exhibited excellent gloss and ejection consistency. In the Examples, the metal pigments had a volume average particle size $D_{50}$ of 1.0 µm or less, the ratio ($D_{50}/Z$) of the volume average particle size $D_{50}$ to the average thickness Z was 17 or more, and the ratio $D_{50}/L$ of the volume average particle size $D_{50}$ of the pigment to the nozzle diameter L was 0.050 or less.

In Comparative Examples 1, 2, and 12, the volume average particle size $D_{50}$ of the metal pigment was not 1.0 µm or less, and the ratio $D_{50}/L$ of the volume average particle size of the metal pigment to the nozzle diameter L was not 0.050 or less. Such ink compositions were inferior in ejection consistency.

Comparative Examples 3, 4, 5, and 13, in which the ratio $D_{50}/Z$ of the volume average particle size $D_{50}$ of the metal pigment to the average thickness Z of the metal pigment particles was not 17 or more, were inferior in gloss.

Comparative Examples 6 to 10 and 14 to 17, in which the ink did not contain a metal pigment treated with a compound represented by formula (1) or (2), were inferior in gloss and ejection consistency.

Comparative Examples 11 and 18, in which the ratio $D_{50}/L$ of the volume average particle size $D_{50}$ of the metal pigment to the nozzle diameter L was not 0.050 or less, were inferior in ejection consistency.

What is claimed is:

1. An ink jet ink composition used by being ejected from an ink jet head with a nozzle diameter L for printing, the ink jet ink composition comprising:
a metal pigment surface-modified with a surface treatment agent, the metal pigment being in a form of scale-like particles having a volume average particle size $D_{50}$ of 1.0 µm or less and an average thickness Z with a ratio $D_{50}/Z$ of the volume average particle size $D_{50}$ to the average thickness Z being 17 or more, the metal pigment having a ratio $D_{50}/L$ of the volume average particle size $D_{50}$ to the nozzle diameter L of the ink jet head being 0.050 or less; and
a liquid medium selected from the group consisting of organic solvents and water,
wherein
the surface treatment agent contains at least one selected from the group consisting of compounds represented by the following formula (1) and compounds represented by the following formula (2):

(1)

wherein $R^1$ represents a substituted or unsubstituted hydrocarbon group with 14 or more carbon atoms, and

(2)

wherein R²s each independently represent a substituted or unsubstituted hydrocarbon group having a carbon skeleton with 14 or more carbon atoms, and a represents 1 or 2.

2. The ink jet ink composition according to claim 1, wherein
the ink jet ink composition is an aqueous composition or a solvent-based composition.

3. The ink jet ink composition according to claim 1, wherein
the ink jet ink composition is an aqueous ink composition in which the amount of the water is 40% by mass or more relative to the total mass of the ink composition, or a solvent-based ink composition in which the amount of the solvent is 60% by mass or more relative to the total mass of the ink composition.

4. The ink jet ink composition according to claim 1, wherein
the volume average particle size $D_{50}$ of the metal pigment is 0.5 μm or less.

5. The ink jet ink composition according to claim 1, wherein
the average thickness Z is 30 nm or less.

6. The ink jet ink composition according to claim 1, wherein
the nozzle diameter L is 30 μm or less.

7. The ink jet ink composition according to claim 1, wherein
the amount of the surface treatment agent is 1.0% to 50% by mass relative to the total mass of the metal pigment.

8. The ink jet ink composition according to claim 1, wherein
at least one of the $R^1$ and $R^2$s contains an unsubstituted hydrocarbon group.

9. The ink jet ink composition according to claim 1, wherein
at least one of the $R^1$ and $R^2$s contains a hydrocarbon group with 15 to 30 carbon atoms.

10. The ink jet ink composition according to claim 1, wherein
the metal pigment contains at least one metal selected from aluminum and aluminum alloys.

11. The ink jet ink composition according to claim 1, wherein the amount of the liquid medium is 60% by mass or more relative to the total mass of the ink jet ink composition.

12. An ink jet printing method comprising:
an application step of ejecting the ink jet ink composition as set forth in claim 1 from an ink jet head with a nozzle diameter L to apply the ink composition onto a printing medium,
wherein
the metal pigment has a ratio $D_{50}/L$ of the volume average particle size $D_{50}$ to the nozzle diameter L being 0.050 or less.

13. The ink jet printing method according to claim 12, further comprising a primarily heating step of heating the ink jet ink composition attached to the printing medium in the application step.

14. The ink jet printing method according to claim 13, wherein
the primary heating step is performed at a heating temperature of 30° C. to 50° C.

* * * * *